(12) United States Patent  (10) Patent No.: US 9,173,527 B2
Ulrich et al.  (45) Date of Patent: Nov. 3, 2015

(54) ICE CREAM SCOOP

(71) Applicant: Belle-V, LLC, Chicago, IL (US)

(72) Inventors: Karl T. Ulrich, Phialdelphia, PA (US);
Jeffrey Allen Salazar, Palo Alto, CA (US); Alan J. Cook, Chicago, IL (US); Jeff Smith, San Francisco, CA (US); Kevin John Augustyniak, Elma, NY (US); Gerard Furbershaw, Menlo Park, CA (US); Kenneth D. Wood, Portola Valley, CA (US)

(73) Assignee: Belle-V, LLC, Chicago, IL (US)

( * ) Notice: Subject to any disclaimer, the term of this patent is extended or adjusted under 35 U.S.C. 154(b) by 0 days.

(21) Appl. No.: 14/521,235

(22) Filed: Oct. 22, 2014

(65) Prior Publication Data

US 2015/0110913 A1 Apr. 23, 2015

Related U.S. Application Data

(60) Provisional application No. 61/894,243, filed on Oct. 22, 2013.

(51) Int. Cl.
*A47J 43/28* (2006.01)
*A23G 9/28* (2006.01)
(52) U.S. Cl.
CPC *A47J 43/282* (2013.01); *A23G 9/28* (2013.01)
(58) Field of Classification Search
CPC ................................ A47J 43/282; A23G 9/28

USPC .......................................... 425/276, 278, 281
See application file for complete search history.

(56) References Cited

U.S. PATENT DOCUMENTS

| 1,472,533 | A | * | 10/1923 | Ripley | 425/281 |
| 1,482,094 | A | * | 1/1924 | Ripley | 425/281 |
| 2,019,566 | A | * | 11/1935 | Gray | 425/276 |
| 2,351,568 | A | * | 6/1944 | Wheaton | 205/73 |
| 4,865,372 | A | * | 9/1989 | Gabriel | 294/49 |
| 6,846,171 | B2 | | 1/2005 | Herbert | |
| 6,997,695 | B2 | | 2/2006 | Horng | |
| D713,219 | S | * | 9/2014 | Ulrich et al. | D7/681 |
| 2005/0150083 | A1 | * | 7/2005 | Roberts | 16/430 |
| 2011/0183025 | A1 | * | 7/2011 | Funka, Jr. | 425/279 |

FOREIGN PATENT DOCUMENTS

CN  201675638 U  * 12/2010

OTHER PUBLICATIONS

Google translation of CN 201675638 U dated Dec. 2010.*

* cited by examiner

*Primary Examiner* — Robert B Davis
(74) *Attorney, Agent, or Firm* — Michael J. Femal; Much Shelist

(57) ABSTRACT

The present disclosure provides an ergonomically designed solid single piece ice cream scoop emerging from a die-cast or forged tool made out of a metal that is finished and polished to eliminate the rough edges from the die casting or forged process with superior mechanical leverage to scoop out the hardest ice cream from a container.

20 Claims, 5 Drawing Sheets

ICE CREAM SCOOP

FIELD OF INVENTION

The present invention relates to a novel ice cream scoop and, in particular, to a generally unitary design for an ice cream scoop with an angled head and raised leading edge or lip to provide maximum leverage to easily drive through the hardest ice cream in a container.

BACKGROUND OF THE INVENTION

Various prior art ice cream scoops have been designed to improve the removal of ice cream from its carton or packaging. Such an ice cream scoop is found in U.S. Pat. No. 6,997,695 that shows a complicated ice cream scoop having a first and second scoop member with two handles hingedly connected to one another. The ice cream scoop is cumbersome to use. Another ice cream scoop found in U.S. Pat. No. 6,846,171 shows a heat transfer ice cream scoop where the handle and scoop are hollow to retain a heated water or other fluid to melt the ice cream during the scooping process. However, this requires messing around with a hot fluid which presents certain known problems.

In short, none of these prior art patents for an ice cream scoop provide an exceptional ergonomically designed ice cream scoop that can drive through hard ice cream working with the natural motion of your wrist or can easily get into those hard-to-reach places at the bottom, sides or corners of the ice cream container. Also, the ice cream scoop provides the user with a substantial mechanical leverage advantage during the scooping operation and allows the wrist to remain in a neutral position.

SUMMARY OF THE INVENTION

An object of the present invention is to provide an ice cream scoop where the handle and scoop are ergonomically designed to aid in the scooping action of removing the ice cream from the carton or container when frozen solid.

A further object of the present invention is providing an ergonomically designed solid single piece ice cream scoop emerging from a die-cast or forged tool made out of a metal that is finished and polished to eliminate the rough edges from the die casting or forged process with superior mechanical leverage to scoop out the hardest ice cream from a container Another object of the present invention is to provide an ice cream scoop that has a maximum mechanical leverage to the end user when removing hard, frozen ice cream from a carton or container.

Yet another object of the present invention is to provide an ice cream scoop that is a stunningly beautiful in design but still performs the removal of hard frozen ice cream in a carton or packaging.

Still another object of the present invention is to provide a pleasing design or even a long lasting heirloom artifact for an ice cream scoop that functionally out performs other ice cream scoops for removing hard frozen ice cream from containers or cartoons.

A further object of the present invention is to provide a handle that is sculpted, weighted and balanced just right in the hand of the user to provide a functionally superior ice cream scoop.

A still further object of the present invention is to provide an ice cream scoop where the scoop works with the natural rolling action of the user wrist to give maximum leverage for easily driving through the hardest ice cream with the raised offset lip on the head of the scoop.

Yet still another object of the present invention an ice cream scoop where the scoop works with a finger grip around the curved handle of the scoop with a top of the handle generally in the palm of the user hand wherein a neutral wrist, hand, arm position results in a pushing action of the user with the arm muscles causing the scoop to cut through the frozen ice cream.

The combination of the handle form, angled head and spade-shaped leading edge delivers an exceptional ergonomic experience while scooping out the hardest ice cream out from a container or carton. Unlike the '171 patent, the ice cream scoop of the preferred embodiment of the invention is forged from a solid single piece of aluminum material having a combination of strength and high thermal conductivity. The heat from the user hand quickly conducts down the handle to the scoop head of the one piece and integral connection of the handle and head for easy release of perfectly shaped balls of ice cream. The heat conducted through the handle to the scoop head prevents the normal sticking of the ice cream ball to the scoop head of traditional ice cream scoops like the '695 patent. Also, the present invention with its improved ergonomic design does not require heated fluid in the handle or scoop head like found in the '171 patent.

The handle of the present invention may also be manufactured out of plastic, wood or other materials but the overall structure is still a unitary body with a raised lip or spade-shaped leading edge of the scoop head that is slightly offset at approximately a 45 degree angle from the longitudinal axis of the handle to the left for right hand users and offset approximately 45 degree angle from the axis of the handle to the right for left hand users. In the preferred embodiment, the handle and attached scoop head are made from a single solid blank or block of ADC12 or 6061 aluminum, which combines strength and high thermal conductivity for the ice cream scoop. However, other materials such as stainless steel, plastic, wood or other materials may for example be used to form the single piece handle and head of the ice cream scoop. The forged aluminum blanks or blocks and the stainless steel blocks or blanks are materials that are suitable for a laser-engraved logo on the scoop that is permanent and does not wear off.

Die-casting, metal forging, injection molding or any other suitable process may be used to manufacture the ice cream scoop, in the preferred embodiment of the scoop, the scoop is further polished and finished by hand after a die-casting or forged machine process or even a CNC machining of a solid metal block, but a variety of other alternate manufacturing processes are acceptable to provide the single piece ice cream scoop. For example, an anodized aluminum process converts the metal surface of the scoop into an oxide finish that will not chip or peel after years of use.

Once the scoop reaches its final form, the scoop may be heat-treated to increase durability; and/or an optional surface coating like anodizing or other industrial strength coating may be applied to enhance the appearance, such as chrome plating, a copper and nickel plating, an electroless nickel finish, a PTFE Teflon finish, silver plating, gold plating or others for long-lasting coatings.

To expedite the dipping of the scoop in baths of surface coating treatments a small hole (not shown) may be configured on the handle for a wire or other hanger to be inserted for the dipping in the treatment baths to coat the surface of the scoop.

Other materials or surface finishes may be applied with or without plating, such as bead blasting, brushing, polishing and other surface finishes.

All of the previously mentioned finishes provide performance enhancements to the scooping action and durability to the scoop of the present invention.

An ergonomically designed ice cream scoop, comprising: a handle; and a scoop head having an irregular bowl shape for receiving scooped balls of an ice cream therein with a generally spade-shaped leading edge integral with a portion of the bowl and extending outwardly therefrom for scooping an ice cream out of a container. The spade-shaped leading edge is designed to be sharp in order to easily penetrate the frozen ice cream. The generally spade-shaped edge is sharp to the point that the curved handle design and sharp edge allows the user to push through any hard ice cream when using the hand, wrist and an in a straight ahead pushing action rather than the natural rolling of the hand, wrist and arm action. Also, in an alternative embodiment the spade-shaped sharp edge is in-line with the axis of the handle allowing a straight ahead pushing action rather than the natural rolling action as described herein below.

An ice cream scoop comprising: a sculpted, weighted and balanced handle in a generally polygonal solid shape, said handle cast from a sold metal blank in a curved configuration from an ergonomic design; and a scoop member having a generally oblong bowl or cupped head integrally connected to the handle cast from the solid metal blank with a spade-shaped leading edge at one portion of the bowl and said spade-shaped leading edge of the scoop member wherein the scoop member is angled at a predetermined angle greater than zero degrees from a longitudinal axis of the handle. This permits a natural rolling action of the fingers gripping the curved handle wherein the wrist and arm created rotate in an easy motion to create the natural rolling action or motion.

In summary, the unique ice cream scoop provides the following advantages: 1) the handle is sculpted, weighted and balanced to feel just right in the end user hand; 2) the angled head works with—not against—the natural rolling action of the end user wrist, hand and arm to give maximum leverage to easily drive through the hardest ice cream; 3) the spade-shaped leading edge helps to get into those hard-to-reach places at the bottom, sides or corners of the ice cream container; 4) the ice cream scoop is made from aluminum, chosen for its strength and high thermal conductivity; and 5) the heat from an end user hand quickly conducts through the handle to the scoop to more easily release ice cream from the scoop head.

BRIEF DESCRIPTION OF THE DRAWINGS

Embodiments of the present disclosure are described by way of following drawings pointing out the various details to the inventive ice cream scoop. The main features and advantages of the present disclosure will be better understood with the following descriptions, claims, and drawings, where:

DETAILED DESCRIPTION OF TEE DRAWINGS

Figure 1:
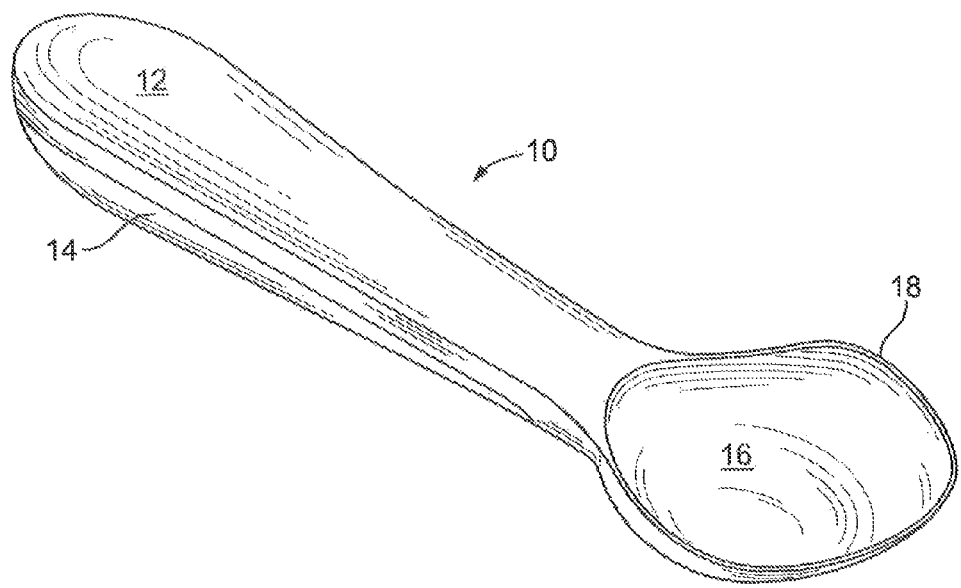
FIG. 1 illustrates a perspective view of a unitary ice cream scoop with a composite handle of metal and plastic or wood made in accordance with the present invention.
Figure 6:
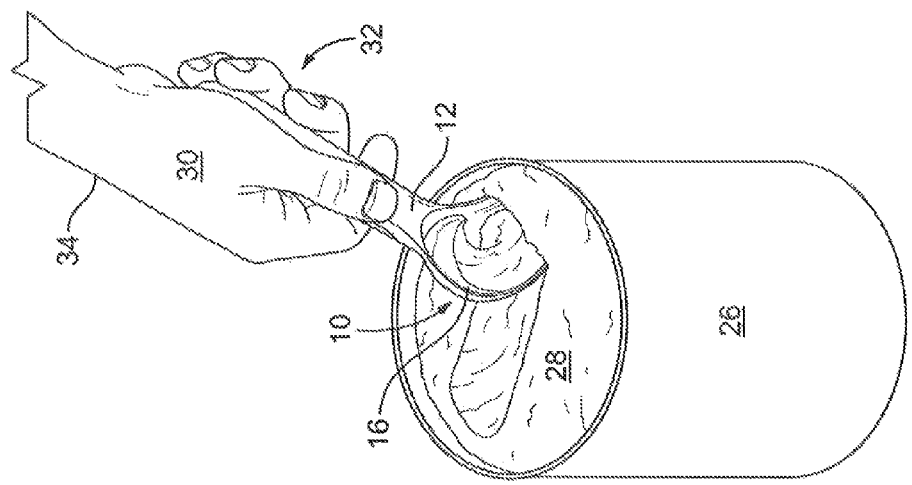
FIG. 6 shows a twist of the wrist action of the end user scooping out frozen ice cream from a carton of ice cream with the ice cream scoop of the present invention as shown in FIG. 1.
Figure 5:
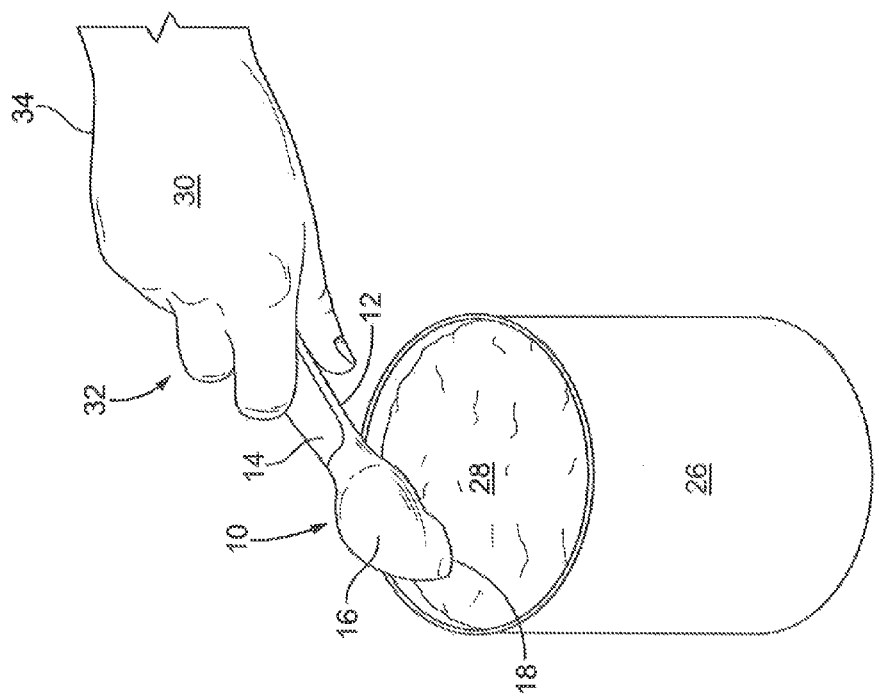
FIG. 5 shows a view of an end user about to scoop frozen ice cream out of a container in accordance with the ice cream scoop of the present invention of FIG. 1.

FIG. 1 shows a unitary construction of an ice cream scoop 10 made in accordance with the present invention wherein the handle 12 is a composite of material that includes a plastic or wood insert 14 on a bottom half of the handle 12 for gripping or even ascetic purposes as the ergonomics remain the same. A scoop head 16 includes a raised spade-shaped edge or lip 18 angled approximately 45 degrees from a longitudinal axis running the length of the handle 12. The lip 18 extending above the oblong bowl of the scoop head 16 provides a mechanical leverage for scooping out the hardest ice cream from a carton or container as shown in FIGS. 5 and 6. The ice cream scoop 10 optimizes the task of scooping ice cream from a carton by the asymmetric handle 12 and refined the geometry of the angled scoop head 16 with spade shaped edge 18.

Figure 2:
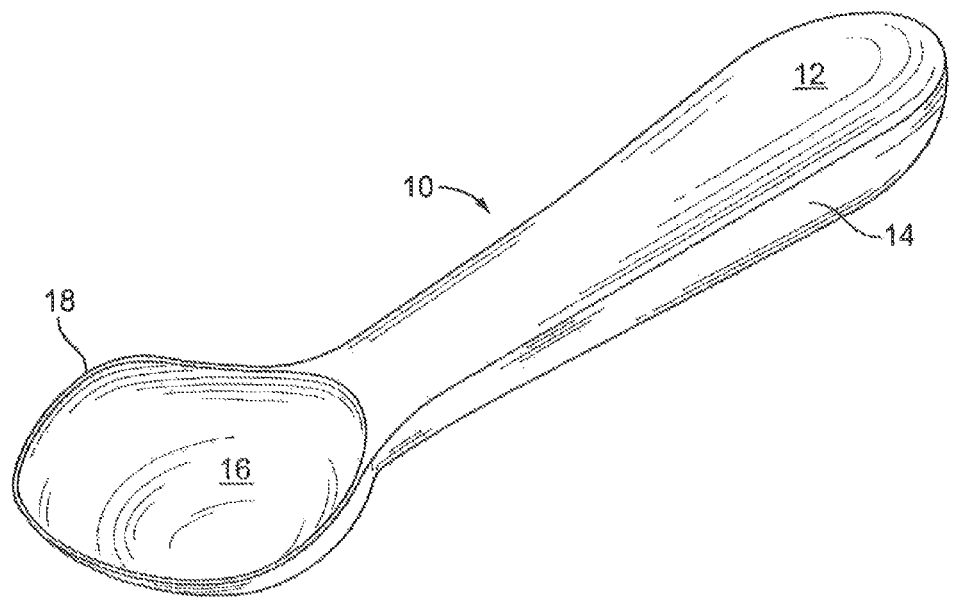
FIG. 2 is a perspective view of the ice cream scoop of FIG. 1 where the handle and scoop are formed from a single material.

FIG. 2 show a unitary ice cream scoop 10 consisting of a one-piece handle 12 integrally formed out of the same solid aluminum cast material as a scoop head 16 and the raised spade-shaped leading edge or lip 18 also angled at approximately 45 degrees from the longitudinal axial length of the handle 12 for a right-hand end user. The oblong scoop member is an angled head from the longitudinal axis of the handle in either a right-hand or a left-hand version, respectively. All though an angled oblong scoop head of 45 degrees has proven to be the best angle, other angles of a lessor or greater angle is possible with this design including a generally oblong scoop with a lip in-line with the longitudinal axis of the handle allowing a pushing motion of the wrist, hand and arm in a straight ahead motion to assist in avoiding an injury to the wrist. The solid aluminum cast scoop is generally made from ADC12 Aluminum that provides a material that combines strength and high thermal conductivity in order to have the heat from the user hand quickly conduct down the length of the handle 20 to the scoop head 22 to easily release the ice cream when scooping frozen ice cream out of a carton or container. This thermal conductivity of the heat through the one piece handle and scoop head prevents the ice cream from sticking to the scoop head 22 or the lip 24 while performing the scooping operation.

As stated before in other words, the scoop 10 begins by emerging from a die-cast tool as a single raw metal blank such as aluminum or stainless steel and then the scoop is formed into the shape as shown in FIGS. 1 and 2 before being optionally heat treated. Each scoop 10 is then finished and polished to provide the final finished unique looking product to eliminate the rough edges of the die-casting process. Durable surface treatments such as chrome or copper and nickel plating or electroless nickel or PTFE Teflon are then applied to the ice cream scoop. Of course a host of other finishes are possible too and would be in keeping with the present invention scoop 10 that works with the natural rolling action of the user wrist and arm to provide the maximum leverage to easily drive through the hardest ice cream within a container as well as get in the hard-to-reach corners of the container without putting undue stress on the wrist of the user. The scoop 10 works and performs well with the scooping action of rolling the wrist and the arm together in a single motion as shown in FIGS. 5 and 6.

Figure 3:
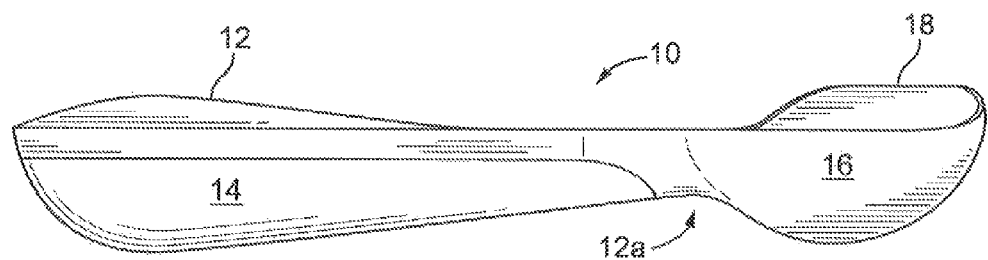
FIG. 3 is a right side elevation view of FIG. 1

FIG. 3 shows a right side elevation of the scoop 10 of FIG. 1 made of a composite handle 12 with a plastic or a wood insert 14 to provide an ergonomically desirable gripping hand surface for the end user of the ice cream scoop 10. Or alternatively, the handle 12 is a single piece of solid forge aluminum with a good heat transfer from the gripped handle to an integral scoop head or bowl 16. A spade-shaped leading cutting edge or lip 18 is shown extending from a portion of a bowl 16 for providing an edge for digging into a hard frozen ice cream that allows an easy scooping of the ice cream out of a container holding the ice cream. The bowl 16 further forms a generally oblong scoop head 16 integrally attached to the handle 12 in order to complete an ergonomically shaped scoop 10.

Further, the scoop handle 12 is sculpted, weighted and balanced to provide just the right feel in the user hand, fingers and palm. The handle 12 extends from the bowl 16 in a generally convex curved shaped 12A on the underside of the handle 12. The shape of the raised spade-shaped leading cutting edge or lip 18 protruding outwardly from a predetermined portion of the bowl 16 helps to provide the mechanical advantage or natural leverage for the scoop 10 when scooping out the ice cream from the container. The scoop 10 works with a natural rolling action of the user wrist and arm together in order to maximize the leverage of the scoop 10 and the rolling action of both the wrist and arm allows the scoop 10 to easily drive through the hardest ice cream without a hard twist of just the wrist of the user hand when scooping the ice cream. This reduces the stress on the wrist of the end user of the scoop 10. The extension of the spade shaped edge or lip 18 extending from the predetermined portion of the bowl allows the user of the scoop 10 to scrape along the bottom of a frozen ice cream carton to remove the last of the ice cream in the bottom thereof with ease.

Figure 4:
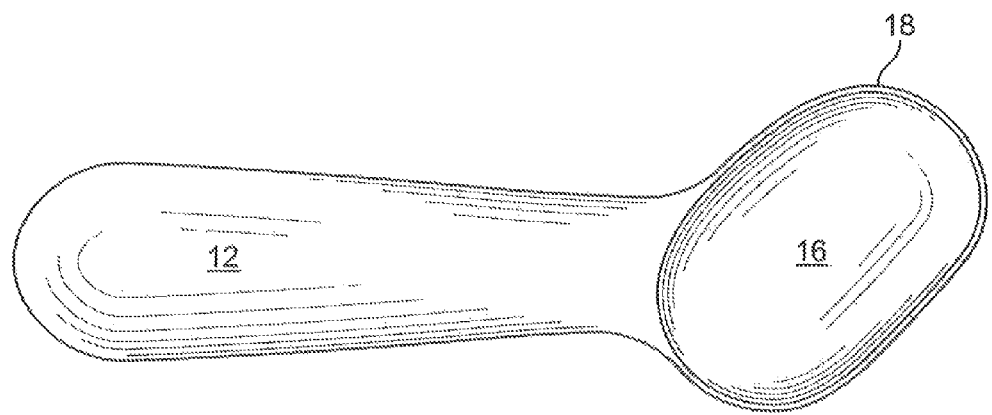
FIG. 4 is a top plan view of FIG. 1.

Turning now to FIGS. 3 and 4, the FIG. 3 shows the right-side elevation of the scoop 10 with an angled head and spade-shaped leading edge that delivers the exceptional ergonomic performance and FIG. 4 shows a top plan view of the ice cream scoop 10 of either FIG. 1 or 2 in which the angle of the scoop head 16 is offset approximately 45 degrees from the longitudinal axis of the handle 12 as shown in FIGS. 1 and 2, respectively.

Again, FIG. 5 shows a carton or container 26 of a hard, frozen ice cream 28 with the user about to engage the top of the frozen ice cream 28 with the raised lip or spade shaped leading edge 18 of the ice cream scoop 10. A hand 30 with fingers 32 of an end user around the handle 12 places the scoop head 16 and the spade shaped edge 18 in the position to dig into the ice cream container 26. The simple rolling motion of the hand 30, a wrist 34 and an arm 36 along with the fingers 32 around the handle 12 applies a torque to the handles allowing the cutting and scooping action of the ice cream scoop 10.

FIG. 6 shows the completed motion of twisting or rolling action of the combined action of the wrist 34 and the user arm 36 to complete the preferred scooping action with the ice cream scoop 10 across the top of the frozen ice cream 28 according to the scoop 10 of the present invention. There is a tremendous leverage accomplished by the design of the scoop 10 that allows the user to cut through the hard frozen ice cream 28 without any difficulty and the overall design of the ice cream scoop 10 and its conductivity of heat through the hand 34 on the handle 12 to the scoop head 16 and lip 18 as well as the various above-mentioned finishes helps to prevent ice cream 28 from sticking to the oblong scoop shaped head 16 and its extending outwardly raised lip 18 during the scooping operation of removing the ice cream 28 from the container 26.

Figure 7:
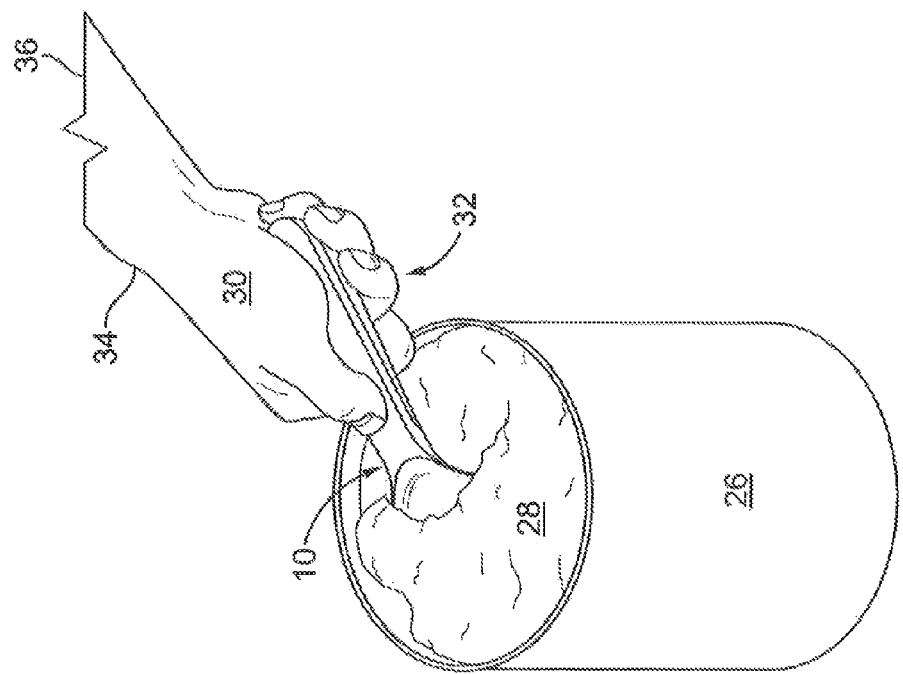
FIG. 7 shows the scoop working at the bottom of the ice cream container in accordance with the invention of FIG. 1.

FIG. 7 shows the angle of an arm 36, the wrist 34 and the fingers 32 on the hand 12 in a normal mode of holding the scoop 10 when digging deep into a bottom 38 the ice cream container 26. Here the end user of the scoop 10 is able to reach into the bottom 38 of the ice cream container 26 and still have the wrist 34 and fingers 32 on the hand 30 and arm 36 in a normal holding position for the ice cream scoop 10.

Figure 8:
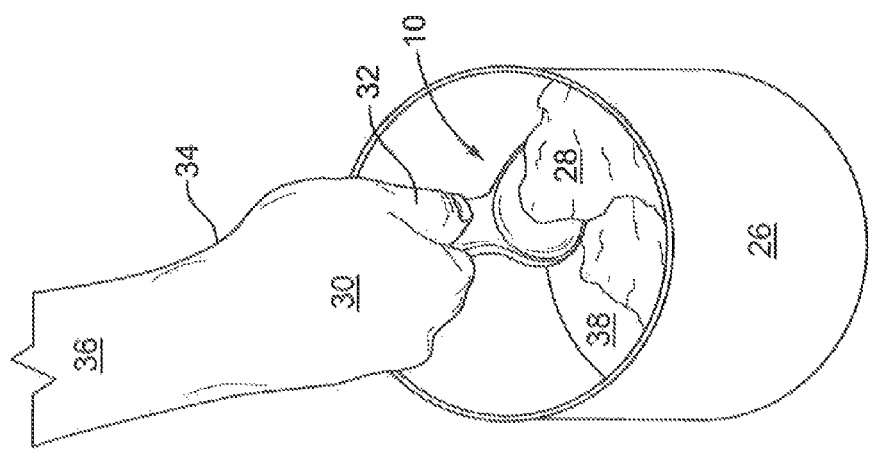
FIG. 8 shows the angle of arm and wrist of the end user in normal mode of holding the ice cream scoop in accordance with the invention of FIG. 1.

FIG. 8. Shows the angle of the arm 36, wrist 34, and fingers 32 on the hand 30 in the position on the scoop handle 12 for the ability of the hand 30 and wrist 34 to apply torque to the handle 12 of the ice cream scoop 10 in order to cut into the hardened ice cream 28 in the carton 26 and to scoop out the ice cream on the scoop head or bowl 16. Again the angle of the arm 36 and wrist 34 are in the normal mode of holding the ice cream scoop 10 as it engages the hardened ice cream within the carton 26.

Figure 9:
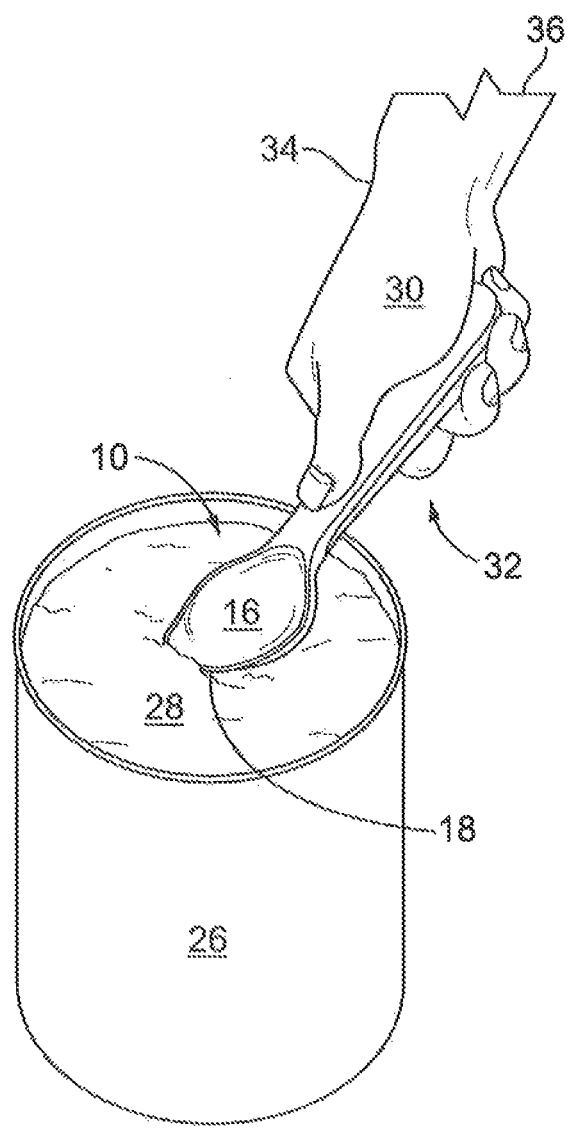
FIG. 9 shows a top plan view of the present invention were the scoop head member includes a leading spade-shaped edge that is generally in-line with the axis of the handle.

Turning now to FIG. 9, the scoop 10 includes the same curved handle 12 attached to the scoop head 16 wherein the spade-shaped leading edge 18 is aligned on the scoop head 16 with the longitudinal length of the handle 12. This allows a pushing motion of the hand on the curved handle 12 where the wrist remains in a neutral position without the natural rolling motion of the hand, wrist and arm to cut into the frozen ice cream 28 but instead utilizes the muscles in the arm to drive the leading edge 18 of the scoop head 16 into the hard ice cream 28 to create the ball of ice cream 28 in the scoop head 16 without any undue stress on the wrist from a twisting action for an end user with less strength in their hand and wrist.

While various aspects and embodiments have been disclosed herein, other aspects and embodiments may be contemplated. The various aspects and embodiments disclosed herein are for purposes of illustration and are not intended to be limiting, with the true scope and spirit being indicated by the following claims.

Having thus described the invention, we claim:

1. An ergonomically designed ice cream scoop, comprising: a handle; and a scoop head integrally attached to the handle having an irregular bowl for receiving an ice cream therein with a generally spade-shaped leading edge integral with a portion of the bowl and extending outwardly therefrom for scooping an ice cream out of a container, wherein the bowl is generally an oblong shaped scoop member attached at one end of the handle at an approximately 45 degree angle from a longitudinal axis running the length of the handle.

2. The ergonomically designed ice cream scoop of claim 1, wherein the handle and scoop head form an integral single piece scoop either die-cast or forged from aluminum.

3. The ergonomically designed ice cream scoop of claim 1, wherein the handle and scoop are form an integral single piece scoop either die-cast or forged from stainless steel.

4. The ergonomically designed ice cream scoop of claim 1, wherein the handle includes a bottom or underside in a generally convex shape for a convenient gripping by fingers of a hand and a placement of the handle in a palm of the hand.

5. The ergonomically designed ice cream scoop of claim 2, wherein the handle and scoop are integral with each other and die-cast or forged from 6061 aluminum.

6. The ergonomically designed ice cream scoop of claim 5, wherein the handle is a composite handle with a plastic or wood inserted on a bottom half of the handle.

7. An ice cream scoop, comprising:
a handle die-cast or forged from metal, said handle having a curved shape; and
a scoop member integral with the handle and die-cast or forged from metal having a generally irregularly shaped bowl, said bowl having a generally spade-shaped leading edge or lip integral with a portion of the bowl and extending outwardly therefrom for digging into a container with a frozen ice cream;
wherein the bowl is generally an oblong shaped scoop member attached at one end of the handle at an approximately 45 degree angle from a longitudinal axis running the length of the handle.

8. The ice cream scoop of claim 7, wherein a bottom or an underside of the handle forms a generally convex curve.

9. The ice cream scoop of claim 7, wherein the handle is die-cast or forged from stainless steel.

10. The ice cream scoop of claim 7, wherein the ice cream scoop provides a natural rolling action of a user hand, wrist and arm together in order to maximize the leverage of the scoop member and the rolling action of the hand, wrist and arm to allow the scoop to easily drive through the hardest ice cream without a hard twisting motion to the hand and wrist when scooping the ice cream.

11. The ice cream scoop of claim 7, wherein the lip digs into the ice cream when scooping ice cream out of the container.

12. The ice cream scoop of claim 7, wherein the handle is made from metal for strength and thermal conductivity wherein heat is transferred from a user hand quickly to the scoop member to help release the ice cream during a scooping action from the ice cream container.

13. The ice cream scoop of claim 7, wherein the scoop member is an angled head with respect to axis of the handle that works with the natural rolling action of a user hand, wrist and arm to drive the scoop member easily through the hard frozen ice cream within the container.

14. The ice cream scoop of claim 7, wherein the scoop member is an angled head from the longitudinal axis of the handle in either a right-hand or a left-hand configuration, respectively.

15. The ice cream scoop of claim 7, wherein the scoop member with the leading edge or lip is in-line with the longitudinal axis of the handle allowing a pushing motion of the hand, wrist, and arm in a straight ahead motion when scooping ice cream from the container to avoid a wrist injury.

16. The ice cream scoop of claim 7, wherein the spade-shaped leading edge or lip of the scoop member allows a user to get the ice cream in hard-to-reach corners of the ice cream container.

17. The ice cream scoop of claim 7, wherein the handle is a sculpted, weighted and balanced in order to provide ease of operation by an end user of the ice cream scoop.

18. An ice cream scoop, comprising:
a sculpted, weighted and balanced handle in a generally polygonal solid shape, said handle die-cast or forged from a metal in a curved configuration to provide an ergonomic design; and
a scoop member having a generally oblong bowl or cupped head integrally connected to the handle die-cast or forged from the same metal to form a single piece scoop with a generally spade-shaped leading edge at one portion of the bowl and said spade-shaped leading edge of the scoop member angled from a longitudinal axis of the handle in a right-hand or a left-hand configuration or in a non-angled straight ahead configuration;
wherein the bowl is generally an oblong shaped scoop member attached at one end of the handle at an approximately 45 degree angle from a longitudinal axis running the length of the handle.

19. The ice cream scoop of claim 18, wherein the scoop member is angled from the longitudinal axis of the handle for either right-hand or left-hand end users using a rolling action from a hand, wrist and arm for scooping out a hard frozen ice cream from a container.

20. The ice cream scoop of claim 18, wherein the scoop member and the generally spade-shaped leading edge or lip on the bowl are in-line with the longitudinal axis of the handle for a straight ahead pushing action with the hand, wrist and arm in a generally neutral position wherein the muscles in the arm are the main driving force for scooping out an ice cream in a container.

* * * * *